Figure 1:
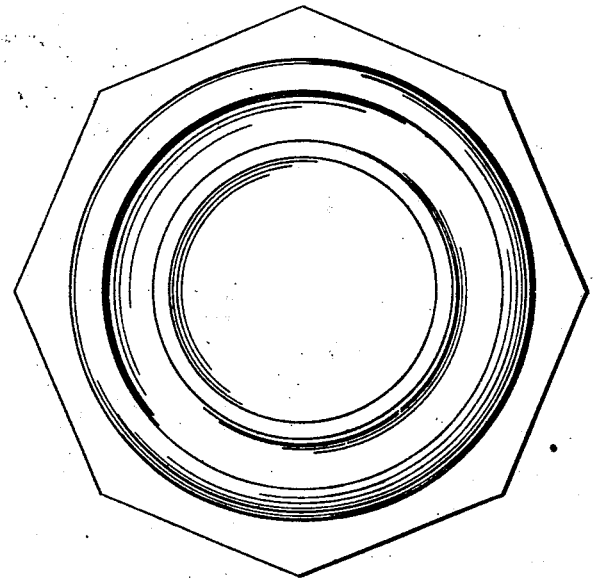
Figure 2:
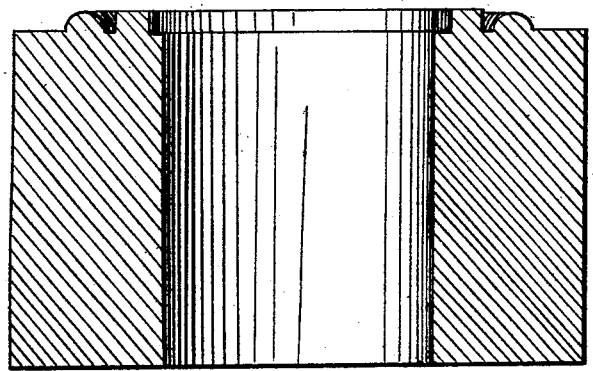

C. Horel,

Artificial Stone.

No. 85,664.

Patented Jan. 5, 1869.

Witnesses

Inventor
Charles Horel

CHARLES HOREL, OF LINCOLN, WISCONSIN.

Letters Patent No. 85,664, dated January 5, 1869.

IMPROVEMENT IN STOVE-PIPE THIMBLES.

The Schedule referred to in these Letters Patent and making part of the same.

*To all whom it may concern:*

Be it known that I, CHARLES HOREL, of Lincoln, in the county of Eau Claire, and in the State of Wisconsin, have invented certain new and useful Improvements in Composition for Stove-Pipe Thimbles; and do hereby declare that the following is a full, clear, and exact description thereof.

The nature of my invention consists in the construction of "stove-pipe thimbles" of a compound made of such ingredients that it shall be a perfect non-conductor of heat, thereby insuring perfect safety from fire, where the stove-pipe passes through wood.

In order to enable others skilled in the art to which my invention appertains, to make and use the same, I will now proceed to describe the manner in which it is or may be made.

The ingredients used in my composition are as follows:

Sand, about one-sixteenth; Rosendale cement, one-half. Then, for a seven-inch thimble, I add about two and one-half quarts of water, in which I put salt, at the rate of one and one-half ounce to one quart of water, one-half ounce of alum, and the remainder of plaster Paris, all mixed and worked well together, when it is poured into moulds, made of any size and shape desired.

The Rosendale cement is inclined to be a conductor of heat, but the addition of salt and alum destroys this property entirely.

The composition, after being moulded, soon becomes hard, and is not only a perfect non-conductor of heat, but also impervious to water.

I do not confine myself to the exact proportions of the ingredients mentioned, as I may vary them somewhat in the construction of different-sized thimbles.

The annexed drawings represent a thimble made of my composition, but they may, of course, be made of any size and shape desired.

Having thus fully described my invention,

What I claim as new, and desire to secure by Letters Patent, is—

1. The within-described composition, when made of the ingredients mentioned, substantially in the manner and for the purposes herein set forth.

2. As an article of manufacture, a stove-pipe thimble, when made of the composition herein described, substantially as set forth.

In testimony that I claim the foregoing, I have hereunto set my hand, this 15th day of December, 1868.

CHARLES HOREL.

Witnesses:
J. M. STOOPS,
J. M. MASON.